United States Patent [19]
Obermark, deceased et al.

[11] 3,846,915
[45] Nov. 12, 1974

[54] MEANS FOR MANUAL DATA REGISTRATION

[75] Inventors: Herbert Mauritz Obermark, deceased, late of Sollentuna, Sweden; by Tommy Ludvig Wilhelm Ekholm, administrator, Stockholm, Sweden

[73] Assignee: Erik Gunnar Ekman, Ska, Sweden

[22] Filed: June 9, 1971

[21] Appl. No.: 151,182

[52] U.S. Cl............................ 33/174 R, 33/174 B
[51] Int. Cl............................................. B41n 1/24
[58] Field of Search....... 33/174 R, 174 B; 209/110; 234/1, 2, 3

[56] References Cited
UNITED STATES PATENTS
2,690,017  9/1954  Neill................................ 33/174 R
3,557,463  1/1971  Perry et al........................ 33/174 B Primary Examiner—Robert B. Hull
Assistant Examiner—Richard R. Stearns
Attorney, Agent, or Firm—Armand E. Lackenbach

[57] ABSTRACT

Method and device for superimposing, in sequence, a plurality of patterns in front of a registration medium and marking different portions of the registration medium from each of the patterns to collect the information generated from all of the patterns on a single registration medium.

7 Claims, 1 Drawing Figure

PATENTED NOV 12 1974
3,846,915
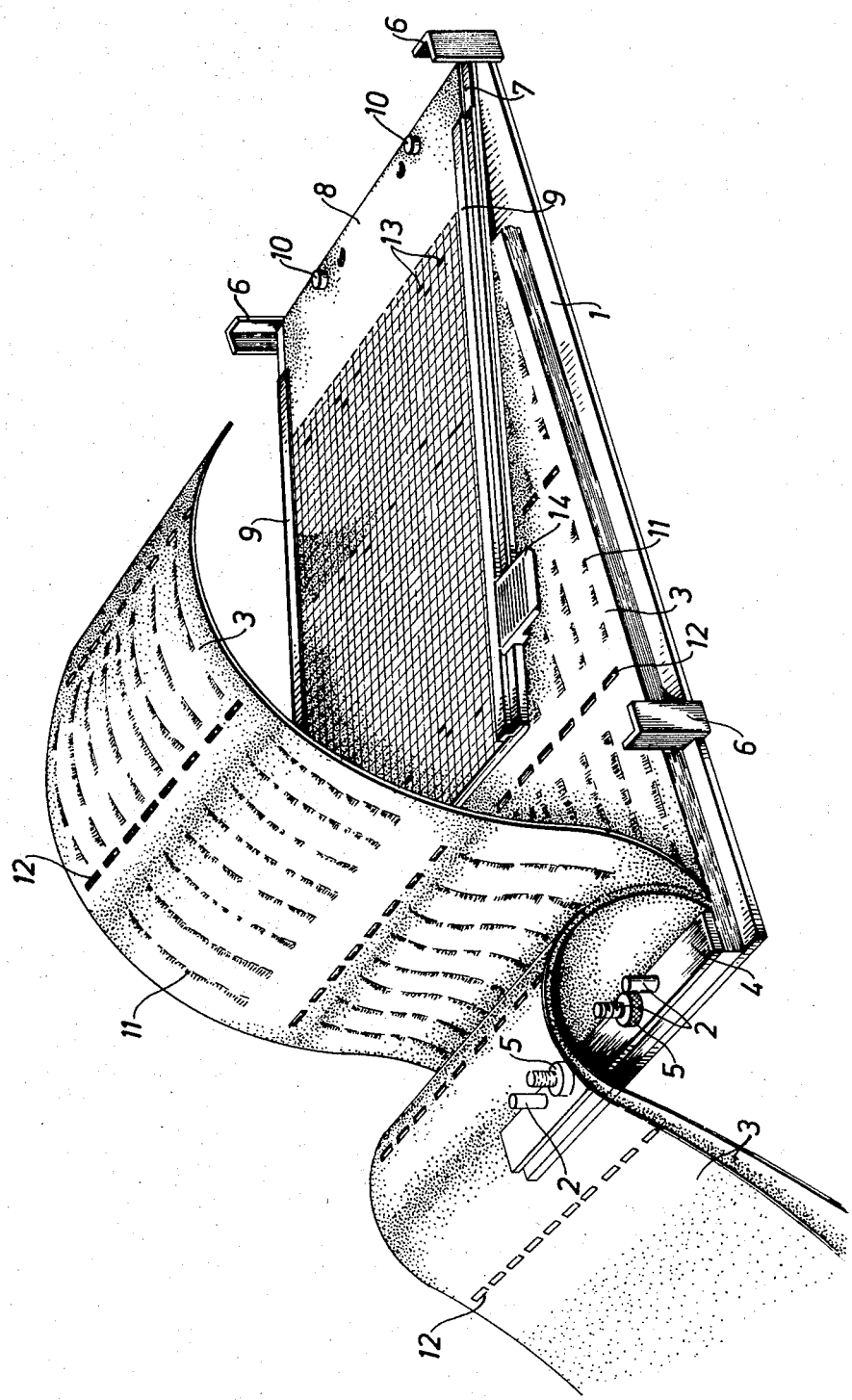
INVENTOR.
HERBERT MAURITZ OBERMARK,
deceased
By TOMMY LUDVIG WILHELM EKHOLM,
administrator
By *Rachenbach & Rachenbach*
ATTORNEYS

MEANS FOR MANUAL DATA REGISTRATION

The present invention relates to a method for manual registration of data, especially of data intended to be subjected to a subsequent automatic processing.

The simplest way of manually registering data consists in writing said data on papers which may have the shape of blanks or forms. If said data relate to a certain predetermined type of events the registration can be carried out simply by providing marks in squares or similar spaces on a form having a suitable directive information printed thereon. This registration method is used inter alia in connection with interview investigations to cut down the time consumed for preparing the interview report. Although the invention is not restricted to the above-mentioned particular field of use, below reference will be made to said application.

In connection with market investigations and the like the report will very often consist of a large number of pages for each person interviewed. In order to facilitate an automatic processing of collected data said data are at a later stage transcribed into a punched card, a punched tape or the like. The main object of the present invention is, on the one hand to facilitate a compression of the collected data quantity already at the primary registration thereof, and on the other hand to eliminate the need for a separate transformation of the collected data into information suitable for machine reading.

The method according to the invention is primarily characterized by placing in sequence one by one of a plurality of patterns in front of a registration medium and providing marks on said medium with the guidance of marking indexes on said pattern, said patterns and said registration medium having preferably the shape of sheets or cards.

Said marks on the registration medium can be of various types. It is, however, desirable that they are of a sort suitable for machine reading. For instance, they may have the shape of small spotlike surface coatings on the registration medium. However, they may also consist of punched holes in said medium. Irrespectively of whether the marks permit an immediate automatic reading thereof or not — they may for instance consist of graphite marks which may serve to control a subsequent automatic punching of holes in the registration medium or a copy thereof — the method according to the invention offers the advantage that the acquired data quantity will be considerably compressed already at the collection thereof.

The invention also relates to a device for carrying out the method above described. Said device is primarily characterized in that it comprises a registration medium, preferably in the shape of a sheet or a card, a plurality of patterns, preferably also in the shape of sheets or cards, having marking indexes provided thereon, and a carrier for the registration medium and the pattern, said carrier being arranged to ensure an accurate mutual positioning of the registration medium and the patterns.

Further characteristics of the invention will appear from the claims and the following detailed description, in which reference will be made to the accompanying drawing showing, by way of example, a perspective view of a device according to one embodiment of the invention. Said device comprises a carrier supporting a bundle of patterns formed by paper sheets and a registration card.

On the drawing reference numeral 1 designates the body of the carrier which consists of a rectangular metal plate having at its left shorter edge two pairs of upstanding pins 2, on which a packet of perforated patterns 3 are filed. Said patterns 3, which may consist of paper sheets, are fixed to the carrier body 1 by means of a clamping bar 4 mounted on the pins 2 and forced against the pattern sheets 3 by means of nuts 5 threaded on the two inner pins 2.

The carrier body 1 also has four upstanding angle bars 6 serving as guide means for a support plate 7 carrying a registration card 8. At each of its two longer edges said support plate 7 has a guide rail 9. Furthermore, at the right shorter side the support plate 7 is provided with two projecting pins 10 on which the registration card 8 is threaded. Thus, the support plate 7 is arranged to provide an accurate positioning of the registration card 8. Moreover, the angle bars 6 on the carrier body 1 provides for an exact positioning of the support plate 7 relatively the carrier body.

As can be seen from the drawing, the registration card 8 is provided with a squared region which can be placed under successive pattern sheets 3. Said sheets 3 are provided with schematically illustrated directive information 11 and marking indexes 12 in the shape of punched holes, which make it possible to register data on the card 8 by inserting a pen through the respective hole and providing a mark 13 in the corresponding square on the registration card 8.

In the embodiment illustrated each pattern sheet 3 is provided with three columns of holes 12. These columns are mutually displaced between different sheets 3 so that each mark square on the registration card will correspond to a certain hole in a certain sheet 3. Within each column the holes may, if required, be spaced so as to make it possible to use additional pattern sheets in which the marking indexes are displaced along the columns a distance corresponding to one half of the spacing between centres of adjacent holes.

The function of the device above described will appear clearly from the drawing. It should only be added that each time a new pattern sheet 3 is to be positioned above the registration card 8 the operator lifts the support plate 7 by means of the handle 14 so that the support plate is turned around its right shorter edge, the pattern sheet just used being simultaneously folded over the clamping bar 4 and the next pattern sheet being applied on the support plate.

Naturally, the invention is not restricted to the above embodiment. Thus, the invention includes a plurality of alternative or modified embodiments. Especially, it should be noted that instead of applying graphite marks suitable for optical or electrical reading on the registration card one may provide marks in the shape of holes in said card. In this case the marking indexes on the pattern sheets do not necessarily have to consist of holes in the latter. It should also be mentioned that the invention can be applied within various fields and that the shape of the patterns as well as of the registration medium may be varied in view of the application in question and the type of processing to which the collected information will be subjected. Thus, the invention also includes, for instance the use of a punched tape as registration medium. Furthermore, the patterns may be provided with marking indexes which at least partially are equally positioned on different patterns, in which case the registration medium has to be placed in different positions for different patterns.

What is claimed is:

1. A device for manual registration of coded data, especially of data intended to be subjected to subsequent automatic process, comprising, in combination, a registration medium of generally rectangular configuration having a plurality of different marking locations arranged in a field of mutually perpendicular columns and rows, a plurality of pattern sheets of generally rectangular sheet-like configuration successively provided with displaced columns of directive information and marking indicia for guiding the recordal of responses to such directive information with said directive information and the indicia related thereto being in rows perpendicular to said columns and with said indicia being in mutually displaced columns on successive ones of said plurality of pattern sheets, and a carrier for said registration medium and said plurality of pattern sheets, said carrier comprising means for simultaneously securably retaining said plurality of pattern sheets and registration medium in predetermined position and for insuring successive accurate mutual positioning of said registration medium and each of said pattern sheets, with each of the marking indices being arranged in a unique position from each of the other marking indices of the respective pattern sheets corresponding to said different marking locations of said registration medium so that marks made corresponding to any of said marking indices appear in a separate position of said field of said registration medium.

2. Device defined in claim 1 wherein said carrier comprises a generally rectangular surface having two generally parallel spaced-apart ends, said patterns being stacked, one above the other, and secured to said carrier adjacent one of said ends, said registration medium being assemblable with said carrier at the other end thereof for sequential interleaving behind each of said patterns while being fixably positioned relative thereto.

3. A device according to claim 1 characterized in that the marking indexes are located, at least partially, in equally spaced apart positions on different pattern sheets.

4. A device according to claim 1 characterized in that the marking indexes consist of pattern sheets of holes in the pattern sheets.

5. A device according to claim 1 characterized in that it includes a generally rectangular carrier on which the pattern sheets are clamped along an edge portion thereof while permitting folding them over said edge portion, said body being provided with guide means for positioning the registration medium.

6. A device according to claim 5, characterized in that the carrier comprises a rigid plate having clamping means for the pattern sheets at said edge portion.

7. A device according to claim 5, characterized in that said guide means for the registration medium are arranged to cooperate with a support plate for rhe registration medium.

* * * * *